United States Patent [19]

Meisenzahl

[11] Patent Number: 4,862,275
[45] Date of Patent: Aug. 29, 1989

[54] READOUT OF CHARGE PACKETS FROM AREA IMAGER CCD USING AN INVERTER-CHAIN SHIFT REGISTER

[75] Inventor: Eric Meisenzahl, Rochester, N.Y.

[73] Assignee: Eastman Kodak Company, Rochester, N.Y.

[21] Appl. No.: 263,302

[22] Filed: Oct. 27, 1988

[51] Int. Cl.[4] .............................................. H04N 3/14
[52] U.S. Cl. ........................ 358/213.29; 358/213.26; 377/54
[58] Field of Search ...................... 358/213.26, 213.29, 358/213.11, 213.31; 357/24 LR, 30 H; 377/54, 57

[56] References Cited

U.S. PATENT DOCUMENTS

| | | |
|---|---|---|
| 3,967,055 | 6/1976 | Teer et al. ........................ 358/213.29 |
| 3,995,107 | 11/1976 | Woywood ........................ 358/213.29 |
| 4,178,614 | 12/1979 | Sauer ................................... 358/213 |
| 4,677,650 | 6/1987 | Boudewijns et al. ................ 377/54 |
| 4,723,168 | 2/1988 | Theuwissen .................... 358/213.26 |
| 4,805,026 | 2/1989 | Oda ................................ 358/213.29 |

OTHER PUBLICATIONS

"The Accordian Imager: an Ultra High Density Frame Transfer CCD", A. J. P. Theuwissen et al.

*Primary Examiner*—Jin F. Ng
*Assistant Examiner*—Stephen Brinich
*Attorney, Agent, or Firm*—Raymond L. Owens

[57] ABSTRACT

An efficient area imager CCD readout scheme in which two electrodes in each column are used to store charge packets and a three electrode technique is used to implement the readout function. A static clock generator drives the CCD electrodes to provide the three electrode technique.

3 Claims, 3 Drawing Sheets

READOUT OF CHARGE PACKETS FROM AREA IMAGER CCD USING AN INVERTER-CHAIN SHIFT REGISTER

TECHNICAL FIELD OF THE INVENTION

The present invention relates to apparatus for providing integration of charge and readout from an area imager CCD.

BACKGROUND OF THE INVENTION

In U.S. Pat. No. 4,178,614 to Sauer, an arrangement for shifting charge packets is disclosed. In this approach, two parallel register arrays (A and B) and a serial register (C) are used to perform the desired readout function. Register A is an area imager CCD having an array of rows and columns of electrodes used to integrate charge employing one electrode to store a charge packet and a second electrode to act as a barrier to isolate the charge from an adjacent charge packet area imager. In each column there are assigned two electrodes per charge packet. The configuration of the array is such that all packets found in each row (or line) of the array are managed and controlled together at once. At the end of the charge integration period, a four electrode per charge packet transfer technique between registers A and B is used to shift the packets to an identical storage register B. In register B, the four electrode per packet transfer technique is converted back to a two electrode storage arrangement as was employed during the register A integration mode. Storage register B is then read into a serial register C, again using a four electrode per packet transfer technique, and subsequently shifted out of the device while register A begins its next integration phase. Generation of the clocking schemes for shifting charge packets from register A to register B and from register B to register C is by use of transistor or CCD shift registers. An example given in the Sauer patent, in column 4, line 53, is the RCA CD4062 200-stage dynamic shift register. The patent indicates that the shifting or transferring of charge packets requires a data clock, two shift clocks (one each for register A and B) and a fourth clock for use in switching between clocking charge packets from register A to register B, or integration of charge in register A.

A paper was written by A. J. P. Theuwissen, C. H. L. Weijtens, L. J. M. Esser, J. N. G. Cox, H. T. A. R. Cuyvelaar and W. C. Keur at the 1984 IEDM conference entitled "The According Imager: An Ultra high Density Frame Transfer CCD." This paper described a method to transfer charge packets using a CCD readout scheme similar to the patent described above. Specifically, the paper discusses a three CCD register device including an image sensor having an array of electrodes, an identical storage array and a serial readout register. Two electrodes in each column are used to collect integrated charge packets. Clocking or readout of the two parallel register arrays is via a dynamic, on chip clock generator using two data clocks and two shifting clocks for each of the two array for a total of 6 clocks. The dynamic shift register consists of a series of CMOS inverters separated by a pass through transistor which, when operated as described, generates the necessary clocking function for reading out the charge packets. During readout, four electrodes per charge packet are used during readout.

The object of this invention is to (1) reduce the number of clocks required to shift the integrated charge to the serial readout register C to a minimum, thus reducing the complexity of the logic timing used to perform the required shifting functions; and (2) eliminate register B thus conserving silicon area (which is very costly) and reducing the number of charge transfers (which degrades performance). The elimination of register B would also reduce the exposure of charge packets to undesired intrinsic charge generation sources corrupting the signal.

SUMMARY OF THE INVENTION

This object is accomplished by apparatus for controlling readout of integrated charge from each row of charge packets, one at a time, from an area CCD image sensor having rows and columns of electrodes into a horizontal CCD comprising:

(a) means for applying during charge integration two different potential levels to alternating rows of electrodes such that two adjacent electrodes in each column are used to collect an integrated charge packet; and (b) readout means including a delay line having a plurality of inverters and resistors connected in series and responsive to a periodic clock signal for applying a predetermined potential level opposite to that applied during charge integration to the first row of electrodes closest to the horizontal CCD, and in sequence delaying in time and then inverting such predetermined potential level and applying such inverted potential level to the next row of electrodes so that three electrodes per charge packet in each column are involved in the transfer of charge packets down to the horizontal CCD. A feature of this invention is a transfer technique using three electrodes. This is accomplished by passing the data clock through a series of inverting circuit stages, separated by a resistor rather than a pass through transistor. The required delay function is self generating by the interaction of the resistor R and the associated capacitance C of the respective electrodes of a row of electrodes of the sensor. As the data clock propagates through the clock generator, the waveform is delayed by an RC time constant producing the desired potential levels or waveforms required to transfer charge packets to a horizontal register H.

DESCRIPTION OF THE DRAWINGS

All drawings represent N-channel devices. The technique also applies to P-channel as well but with opposite applied polarity voltages.

Modes of Operation

Figure 1:
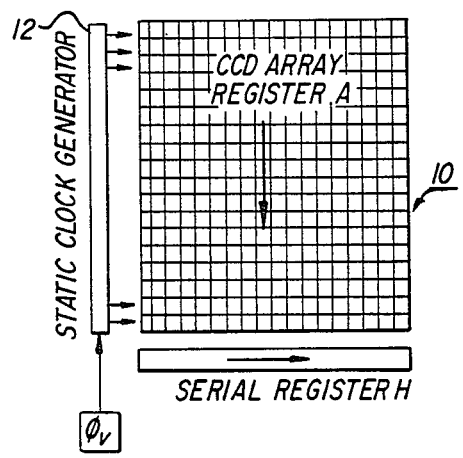
FIG. 1 shows an area image sensor including CCD area sensor (register A), horizontal serial CCD register H, static clock generator and a data clock ($\phi_v$).

Referring to FIG. 1, a conventional area image CCD sensor 10, having rows and columns of electrodes E, responds to incident light and integrates charge by converting incident light into electric charge packets. The amount of charge collected in any given charge packet is dependent on many factors including the size of the sensing element, amount of time a potential well is exposed to light and the intensity and wavelength of the light itself. The area image sensor A is clocked by potential levels or waveforms produced by a static clock generator 12 which responds to a single data clock ($\phi_v$). A horizontal serial CCD (register H) is provided for reading out each line of register A charge packets to subsequent processing circuits.

Figure 3:
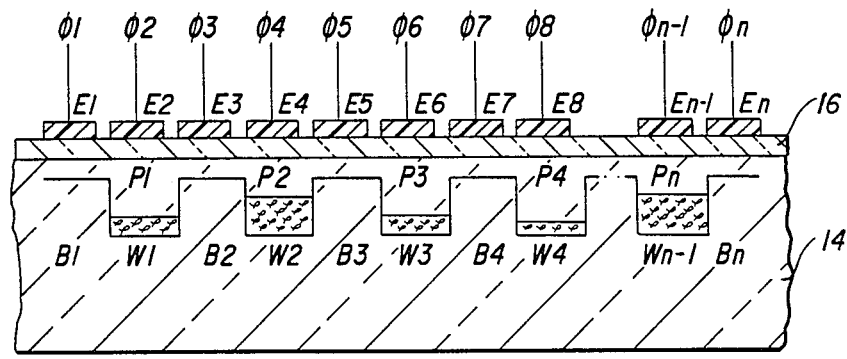
FIG. 3 shows the cross section of a column of electrodes of the CCD sensor.

The details of the imaging cells or potential wells and their behavior are well know and will not be discussed in detail here. It is assumed that, upon the commencement of readout, the two electrode per charge packet in each column is used. This is shown in FIG. 3. This condition is also shown as time t0 in FIGS. 4 and 5.

As shown in FIG. 3 sensor 10 consists of a silicon substrate 14, a thin layer of insulator such as silicon dioxide 16 and an overlying grid of conducting electrodes ($E_1$-$E_n$) such as doped polysilicon which, when stimulated with a potential level, create potential barriers or wells to the collected charge in the silicon substrate.

Figure 2:
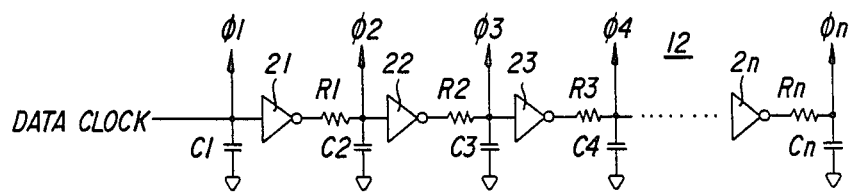
FIG. 2 shows a schematic of the static clock generator consisting of inverting circuits (21-2n), resistor elements ($R_{21}R_{2n}$), the capacitance ($C_1$-$C_n$) associated with the corresponding rows of electrodes.
Figure 4:
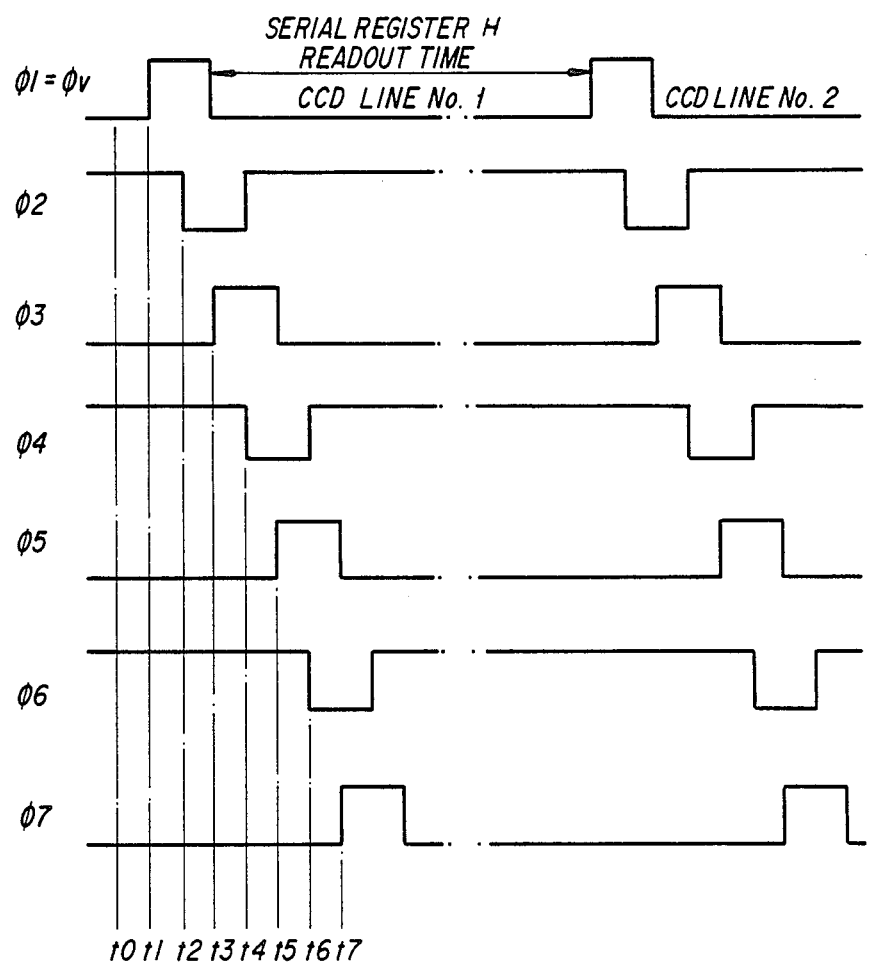
FIG. 4 shows the clocking voltage waveforms generated by the clock generator shown in FIG. 2 at time intervals ($t_0$-$t_9$).
Figure 5:
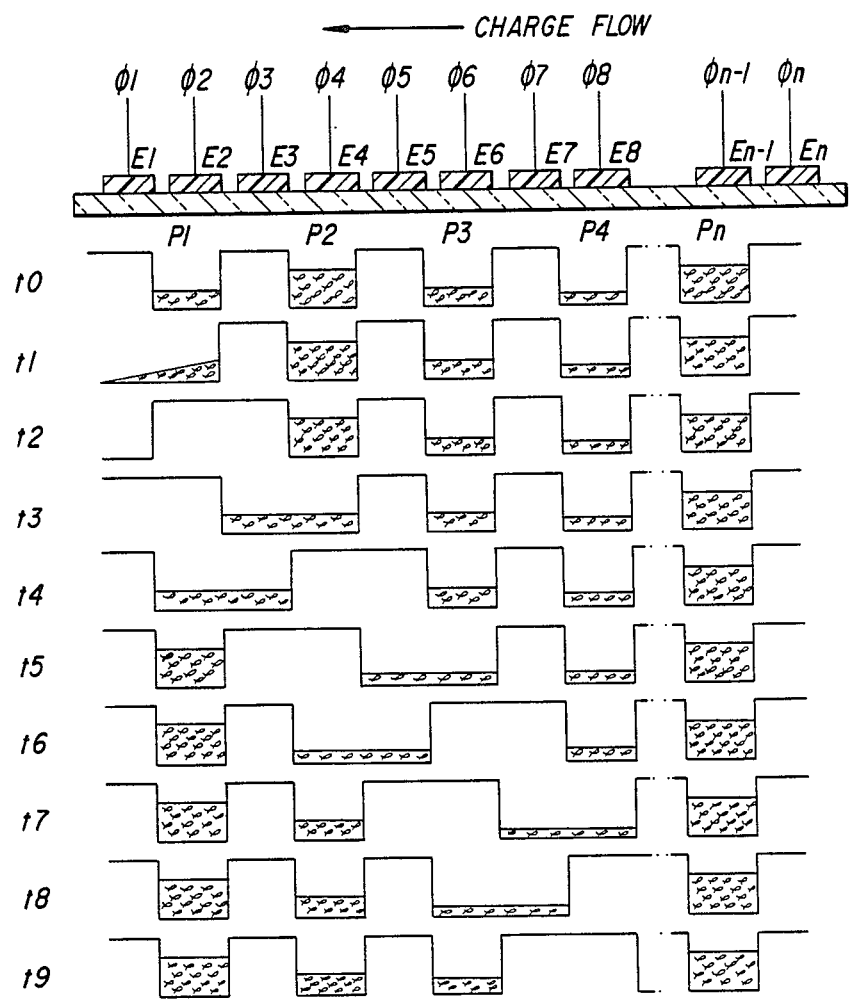
FIG. 5 represents the potential wells and barriers that occur through time ($t_0$-$t_9$) as the waveforms from FIG. 4 are applied to the electrodes ($E_1$-$E_n$). This figure displays how the three electrode per charge packet transfer technique operates.

To transfer the charge packets to horizontal register H without mixing charge packets begins by applying a positive going pulse with the proper voltage levels using the data clock as $\phi_v = \phi_1$ as shown at time $t_1$ in FIG. 4. The data clock drives the capacitance (C1) associated with a row of electrodes and the input to inverter 21. FIG. 3 does not reflect that the electrodes are overlapping. Drawn also are the potential wells (W1-Wn) and barriers (B1-Bn) formed during the integration or initial state (or before the CCD array is to be readout into the horizontal register H when the appropriate potentials levels ($\phi_1$-$\phi_n$) are applied at electrodes (E1-En). This is also shown in FIG. 2 schematically. This figure represents the well known two electrodes per charge packet storage or integration technique. The capacitance ($C_1$-$C_n$) is mostly derived from the insulator thickness between the electrodes of a row and the silicon substrate. This pulse, when applied to $\phi_1$, causes the barrier shown as $B_1$ in FIG. 3 to become a well. This allows charge packet $P_1$ to spill into the regions occupied by $\phi_1$, $\phi_2$ and into register H for readout (see time $t_1$, FIG. 5).

As this spillage takes place, the potential level from the clock $\phi_v$ pulse passes through inverter 21 which provides current gain and level shifting to the low level potential. The inverter consists simply of two field effect transistors which switch the output to a high potential (if a low potential input is sensed) and a low potential (if a high potential input is sensed). This inverted pulse then passes a series resistor R1 which drives the capacitance C2 and the input to the next inverter stage 22. The static clock generator is shown in FIG. 2. The series resistor R1, when coupled with the capacitance $C_2$, has the effect of delaying the inverted clock by an RC time constant. The amount of delay is chosen, through resistor values, to be one half the pulse width of the original data clock $\phi_v$. This forces the electrode $E_2$ to change from the well state (W1 of FIG. 3) to a barrier state while electrode $\phi_1$ is still in the well state. This forces the charge from packet P1 to now occupy either the region under electrode $\phi_1$ of serial register H. This configuration is found at time $t_2$ of FIGS. 4 and 5.

The next action occurs as the negative edge of the clock $\phi_v$ is sensed at electrode $\phi_1$. This returns the $\phi_1$ electrode region back to its initial barrier state spilling any remaining charge from P1 completely into register H. This is shown at time $t_3$ of FIGS. 4 and 5. At this time the readout of the first line of charge packets, now in register H from their original location under electrode 02, can commence. Meanwhile, the data clock $\phi_v$ has propagated through inverter 22 and series resistor R2 to the input of inverter 23 and the E3 electrode. Because another RC delay circuit was experienced, the electrode E3 experiences a positive going edge at about the same time as electrode E1 returns to its initial state. This has the effect of lowering the barrier under electrode E3 into a well state thus allowing the $P_2$ charge packet to spill under the regions occupied by electrode $\phi 3$ and $\phi 4$ as shown at time $t_3$ of FIGS. 4 and 5.

This action continues until the data clock pulse propagates to the end of the clock generator. It is important to note that it is not necessary to wait until the first data clock pulse propagates through the entire clock generator 12 to initiate the next sequence and thus transfer the next line of charge packets to register H for readout. The earliest time the second pulse can be initiated, however, is shown at time $t_5$ of FIG. 5 but is probably more dependent on whether register H has completed reading out the previous line of charge.

Advantages

The invention described contains the following advantages over previous art:
(a) requires a single data clock for the transferring of charge packets;
(b) uses statically driven clock generator for increased reliability ; and
(c) eliminates the need for a storage array thus reducing the number of charge transfers and exposing charge packets to undesired intrinsic charge generation sources.

The invention has been described in detail with particular reference to a preferred embodiment thereof, but it will be understood that variations and modifications can be effected within the spirit and scope of the invention.

I claim:

1. Apparatus for controlling readout of integrated charge from each row of charge packets, one at a time, from an area CCD image sensor having rows and columns of electrodes into a horizontal CCD comprising:
    (a) means for applying during charge integration two different potential levels to alternating rows of electrodes such that two adjacent electrodes in each column are used to collect an integrated charge packet; and
    (b) readout means including a delay line having a plurality of inverters and resistors connected in series and responsive to a periodic clock signal for applying a predetermined potential level opposite to that applied during charge integration to the first row of electrodes closest to the horizontal CCD, and in sequence delaying in time and then inverting such predetermined potential level and applying such inverted potential level to the next row of electrodes so that three electrodes per charge packet in each column are involved in the transfer of charge packets down to the horizontal CCD.

2. The apparatus of claim 2 wherein each resistor is connected to the electrodes of a row of electrodes and with the capacitance associated with the electrodes of such row produces such delay in time.

3. A method of controlling readout of integrated charge from each row of charge packets, one at a time, from an area CCD image sensor having an array of rows and columns of electrodes into a horizontal CCD, comprising the steps of:

(a) applying during charge integration two different initial potential levels to alternate rows of electrodes such that two adjacent electrodes in each column are used to collect an integrated charge packet; and (b) reading out the integrated charge packets into the horizontal CCD by:
   (i) periodically applying a predetermined potential level opposite to that applied during charge integration to the first row of electrodes closest to the horizontal CCD; and
   (ii) in sequence delaying in time, and then inverting such predetermined potential level and applying such inverted potential level to the next row of electrodes so that three electrodes per charge packet in each column are involved in the transfer of charge packets down to the horizontal CCD.

* * * * *